Jan. 20, 1942.    P. CLARE    2,270,270

MOLDED PLASTIC GEM

Filed April 20, 1940

PHILIP CLARE
INVENTOR.

BY Irving Seidman
ATTORNEY.

Patented Jan. 20, 1942

2,270,270

UNITED STATES PATENT OFFICE 2,270,270

MOLDED PLASTIC GEM

Philip Clare, East Orange, N. J.

Application April 20, 1940, Serial No. 330,689

6 Claims. (Cl. 63—32)

This invention relates to improvements in imitation gems made of plastic material and used for ornamental purposes.

An object of this invention is to provide imitation gems made of plastic material which will closely simulate the genuine gems, which shall be sparkling and lustrous, and which may be manufactured at a low cost.

Another object of this invention resides in a method whereby imitation gems made of plastic material may be produced by securing a highly polished metal backing in the form of a disk to the bottom face of the imitation crystal, gem or stone, the backing having one surface with a mirror-like finish and a serrated outer periphery and being secured in permanent intimate union with the plastic material by the application of pressure and heat during the molding of the plastic material.

Another object of this invention resides in the provision of imitation gems of this nature which shall be simple in construction, strong and durable, and well adapted for the purpose for which the gems are intended.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which.

In the illustrated embodiment of the invention, the numeral 10 indicates an ornamental body simulating a gem 11 made of transparent plastic material and having a plurality of facets 12 on the exposed surface thereof. The facets are formed under pressure and heat in a mold having facet producing surfaces simulating the outer surface of a gem.

Each individual facet upon the face of the body will have a counterpart upon the rear side of the body, and the oppositely disposed or registering facets or faces upon the two sides of the body will be substantially parallel.

Figure 3:
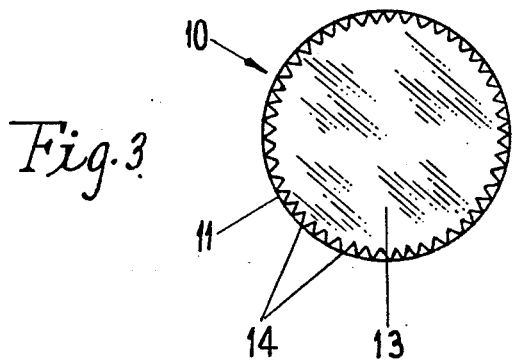
Figure 3 is a bottom view of the gem, showing the reflecting backing disk having a serrated periphery.

The reflecting backing consists of a disk 13, preferably made of a metal adapted to receive a high polish so as to be highly reflective. As best shown in Figure 3, the outer periphery of the disk 13 has been serrated to provide angular projections 14.

For the purpose of bringing the body 10 and disk 13 in intimate permanent union, a transparent thermoplastic is employed, that is, a plastic of the type which will soften when sufficiently heated and which after molding in a gem-forming mold will be adapted to form facets or small triangularly positioned intersecting surfaces on the outer surface of the gem.

The initial step of the method is the introduction into the gem-forming mold of the transparent plastic material and the pre-shaped reflecting member.

Under the application of heat and pressure, the plastic or semi-molten material enters the serrations and the body 11 becomes intimately associated with the reflecting disk 13. The unification is completed by the pressure which acts to shape the outer surface of the gem and forms the facets.

It is to be noted that the reflector member 13 is preferably of flat metal, and constructed of a heat resistance material, and finished with a brilliance which will present the sparkle to the completed gas. Each individual facet upon the outer surface of the body will thus be enabled to reflect rays of light with great brilliancy and without disclosing the means by which it is accomplished.

An imitation gem of great brilliancy may be produced at a very moderate expense, the size of the gems produced being practically limitless.

Figure 1:
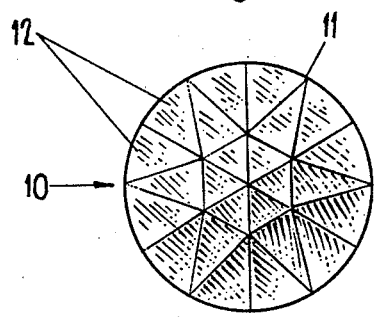
Figure 1 is a top plan view of a plastic gem embodying my invention, on an enlarged scale.
Figure 2:
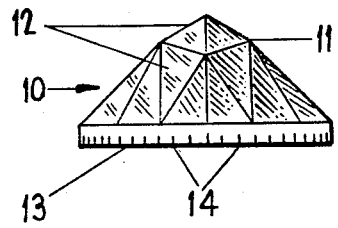
Figure 2 is a side elevation of the gem shown in Figure 1, in assembled condition.
Figure 4:
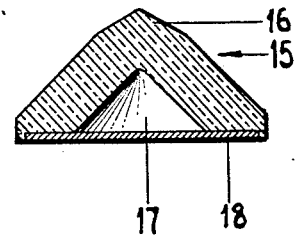
Figure 4 is a cross-sectional view of a modified gem.

Figure 4 shows a modified plastic gem 15 having a plastic body 16 and a hollow chamber 17. The walls defining the chamber 17 are substantially in parallel relation with the exterior walls of the gem 15. The reflecting backing disk 18 has been secured to the plastic body 16 by heat and pressure similar to the structure shown in Figures 1 to 3, inclusive.

In accordance with the patent statutes, I have described and illustrated the preferred embodiments of my invention, but it will be understood that various changes and modifications can be made therein without departing from the spirit of the invention as defined by the appended claims.

I claim:

1. An imitation gem comprising a transparent plastic body provided on its outer surface with facets, said body having a substantially flat base portion, a disk on which said base portion is secured in contacting relation, said contacting disk surface being highly polished, said disk having serrations on its outer periphery and being secured to said plastic body by portions of said body entering said disk and uniting therewith in intimate, permanent union.

2. An imitation gem comprising a transparent plastic body provided on its outer surface with triangularly shaped intersecting ornamental figures, said body having a substantially flat base portion, a disk on which said base portion is secured in contacting relation, the contacting disk surface being highly polished, said disk having serrations and being secured to said plastic body by portions of said body entering said serrations and uniting with said disk in intimate permanent union.

3. An imitation gem comprising a transparent plastic body, provided on its outer surface with facets, said body having a substantially flat base portion, a hollow chamber within said gem, a flat reflecting backing disc attached directly to said base portion.

4. An imitation gem comprising a transparent plastic body, provided on its outer surface with facets, said body having a substantially flat base portion, a hollow chamber in said gem, the walls of said chamber being in substantially parallel relation to said outer surface of said gem, a flat reflecting backing disc attached directly to said base portion.

5. A flat-backed jewel comprising in combination a shaped body of light transmitting material with a relatively deep recess in the back thereof, at least one of the surfaces of the body being faceted, and a flat reflecting disc attached directly to the back of the body.

6. A flat-backed jewel comprising in combination a shaped body of light transmitting material having a relatively deep recess in the back thereof, one of the surfaces of the body being faceted and the other unfaceted, and a flat reflecting disc attached directly to the back of the body.

PHILIP CLARE.